United States Patent [19]

Mischneko

[11] Patent Number: 5,185,790
[45] Date of Patent: Feb. 9, 1993

[54] MULTIPOSITION DETENTING HINGE APPARATUS

[75] Inventor: Nicholas Mischneko, Mt. Prospect, Ill.

[73] Assignee: Motorola, Inc., Schaumburg, Ill.

[21] Appl. No.: 677,022

[22] Filed: Mar. 28, 1991

[51] Int. Cl.$^5$ .............................................. H04M 1/00
[52] U.S. Cl. .................................... 379/433; 16/321; 16/334
[58] Field of Search .................. 379/433, 434; 16/334, 16/321

[56] References Cited

U.S. PATENT DOCUMENTS

| | | | |
|---|---|---|---|
| 3,476,886 | 11/1969 | Ferrari et al. | |
| 4,018,998 | 4/1977 | Wegner | 379/433 |
| 4,424,606 | 1/1984 | Sorimachi | 16/321 |
| 4,471,493 | 9/1984 | Schober | 455/90 |
| 4,543,006 | 9/1985 | Wang | 16/334 |
| 4,577,986 | 3/1986 | Wang | 16/334 |
| 4,845,772 | 7/1989 | Metroka et al. | 379/433 |
| 4,897,873 | 1/1990 | Beutler et al. | 379/433 |
| 5,111,503 | 5/1992 | Takagi | 379/433 |
| 5,117,073 | 5/1992 | Mischenko | 379/433 |

FOREIGN PATENT DOCUMENTS 220579 5/1987 European Pat. Off. .

OTHER PUBLICATIONS

A user's manual for the "Pocket Commander"(TM) manufactured by Fujitsu model no. F80P-171 utilizes a foldable housing portion attached to a body portion shown on p. 4. The angle of the foldable portion with respect to the body portion is determined by a U-shaped wire spring, held in a fixed position, applying pressure to planar surfaces on the hinge shaft.

An owner's manual for a cordless electronic telephone manufactured by Radio Shack as DUOFONE model no. ET-415. Has two shafts with the cord centers connecting a flip element to the main housing of the body. The flip element is held in the open or closed position by two spring loaded fingers which press on the flip element and into depressions on the flip element exterior.

An FCC filing for Panasonic model no. KX-T3000H. Has a flip element rotated relative to a main housing or body portion. The flip element is held in its closed position by latching the flip element to the body portion of the radiotelephone. To dispose the flip element at an angle to the body portion the latch is released whereby the flip element springs open to a predetermined obtuse angle. The obtuse angle is created by a helical spring having one end attached to the flip element and the other end attached to the body of the radiotelephone.

"The GTE Flip-Phone Telephone", William J. Ruffer, GTE Automatic Electric Journal, vol. 16, No. 6, Nov. 1978.

*Primary Examiner*—Jin F. Ng
*Assistant Examiner*—Huyen D. Le
*Attorney, Agent, or Firm*—Kevin D. Kaschke; Raymond A. Jenski; John Fisher

[57] ABSTRACT

A hinge apparatus for a foldable telephone (100) includes a body portion (101) and a flip element (103). The flip element (103) is held in a closed (FIG. 3A) and a open (FIG. 3B) position relative to the body portion (101) by an enclosed follower (201) which follows recesses (301 and 303) in two hinge shafts (205 and 207) integral to the hinge portion (112) of the flip element (103). The apparatus is assembled along a common axis (233) from a single direction. The flip element (103) is held tight against a keypad (109) of the body portion (101) in its closed position (FIG. 3A). The flip element (103) is secured in its open position (FIG. 3B) with no excessive play.

14 Claims, 3 Drawing Sheets

MULTIPOSITION DETENTING HINGE APPARATUS

FIELD OF THE INVENTION

This invention relates generally to hinged housings for miniature electronic equipment and more particularly to foldable radiotelephones which utilize a detenting hinge apparatus to locate the position of the folding portion.

BACKGROUND OF THE INVENTION

Portable, cellular phones are increasingly utilized to permit a user to communicate telephonically over a wireless system at virtually any location. The portable telephone transmits a low wattage, radio frequency signal to a receiving station whereat connections are provided with conventional telephone systems. Numerous receiving stations are spaced apart at fixed locations in an area to receive the signals transmitted by the portable telephone as the portable telephone is relocated throughout the area.

Telephones utilizing two housing elements connected with some type of hinging mechanism, are common in wireline telephone sets and landline wireless extension phones and have become more common in portable cellular radiotelephones. This folding arrangement allows for the telephone to be more compact when the two housings are folded upon themselves.

Some radiotelephones which utilize this type of design have most of the electronics within the larger of the two housings. The smaller housing, which will be called the flip element hereinafter, normally contains the microphone and the ringing element. For good acoustical performance, the flip element must be held in an optimum position relative to the body of the radiotelephone. In doing so, the microphone is positioned a desired distance from the user's mouth.

Other radiotelephones which utilize this type of design have all the electronics within the larger of the two housings. The flip element contains no electronics. A flip element of this sort may have the capability of producing an on-hook condition when the flip element is in the "closed" position and an off-hook condition when the flip element is rotated to its "opened" position. A radiotelephone which employs the position of the flip element for control purposes was described in U.S. Pat. No. 4,845,772. When the flip element is in its "closed" position the radiotelephone is in a standby state ready to receive an incoming call. The flip element covers at least a portion of the keypad on the body of the radiotelephone thereby shielding the keys to avoid accidental key depression or contamination of the keys with foreign material. When the flip element is in the "opened" position, some background noise is shielded from the microphone by the flip element.

A variety of techniques have been used to position the flip element in the closed and open position. A radiotelephone which holds the flip element in the closed and open position using an enclosed cam element which follows recesses in one shaft securing the hinge elements was described in U.S. Pat. No. 4,897,873. A cellular telephone named "Pocket Commander" (TM) manufactured by Fujitsu model no. F80P-171 utilizes a partially cylindrical hinge shaft having two essentially planar surfaces. The the plane of the each planar surface intersects to form an acute angle. A U-shaped wire spring, held in a fixed position, applies pressure to one planar surface of the rectangular portion of the hinge shaft to hold the flip element in its closed position. As the flip element is rotated, the wire spring expands around the cylindrical surface portion of the hinge shaft until the wire spring applies pressure to the other planar surface of the rectangular hinge portion of the hinge shaft to hold the flip element is then held in its open position. A cordless radiotelephone manufactured by Panasonic model no. KX-T3000H utilizes a helical spring having each end extended beyond the helix forming a predetermined obtuse angle. One end of the helical spring is attached to the flip element. The other end of the helical spring is attached to the body of the radiotelephone. In its closed position the flip element is latched to the body of the radiotelephone. When the latch is released the flip element springs away from the body of the radiotelephone to its open position determined by the obtuse angle formed by the ends of the helical spring.

Such assemblies which predetermine the position of the flip element, however, require a multiple-step process in order to a fix the hinge assembly to the housing of the radiotelephone. Such a process is time consuming and additionally, is susceptible to assembly error and/or subsequent failure during use of the assembly.

Furthermore, increased miniaturization of radiotelephones allow the radio telephones to be packaged in housing of even smaller dimensions. The hinge assemblies described herein above are of dimensions which limits further decrease in the housing size of the radiotelephone.

Therefore, a new hinge assembly design is required which is of simpler construction as well as of smaller dimensions.

SUMMARY OF THE INVENTION

A hinge apparatus for a foldable radiotelephone having a body portion and a flip element portion is capable of maintaining the flip portion in a position of rotation relative to the body portion. An essentially cylindrical hinge shaft, integrally formed with the flip element portion and at least partially disposed within the body portion, rotatably couples the flip element portion to the body portion. A recess is disposed in a surface of the cylindrical hinge shaft. A follower, disposed within the body portion, contacts the recess when the flip element portion is rotated to the position to thereby maintain the flip element portion in the position.

BRIEF DESCRIPTION OF THE DRAWINGS

The present invention will be better understood when read in light of the accompanying drawings in which.

BRIEF DESCRIPTION OF THE PREFERRED EMBODIMENT

Figure 1:
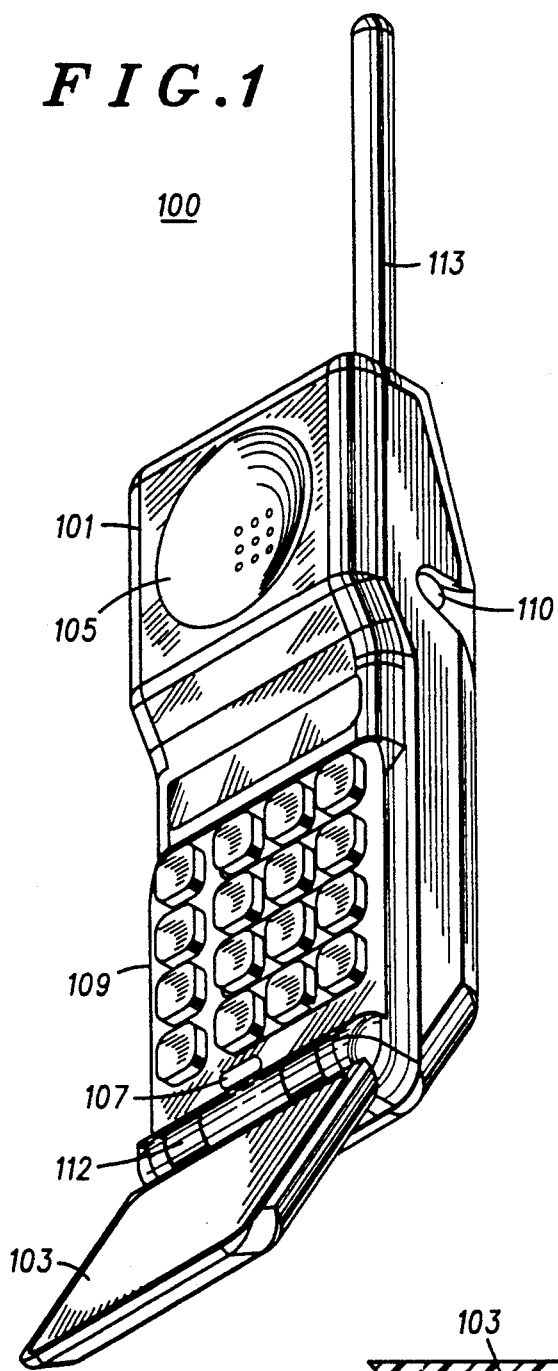
FIG. 1 is an perspective illustration of a cordless radiotelephone unit constructed in accordance with the present invention.

A portable radiotelephone adapted for use in a cordless radiotelephone system is shown in FIG. 1. This portable unit 100 consists basically of two readily apparent portions, a body portion 101 and a flip element portion 103. The drawing of FIG. 1 shows the flip element in an "open" position such that a user of the portable unit may listen via earpiece 105 and may speak into the microphone 107. The keypad 109 consists of a plurality of buttons numbered one through zero, #, and *, in a familiar telephone arrangement. The keypad 109 may also have additional functions buttons such as channel select, volume control, and other buttons associated with telephone number recall. A charging contact 110 enables a battery within the portable unit 100 to be recharged when the charging contact 110 is mechanically coupled to a mating contact on a base station (not shown). An antenna 113 enables wireless communication between the portable unit and the base station.

When the flip element 103 is open as shown in FIG. 1, the portable cordless telephone can be in a state of answering or making a telephone call. Such a state is commonly known as "off-hook". Upon completion of a telephone call, the user may hang up the portable unit by moving the flip element into a closed position. This hanging-up may be accomplished by causing the flip element 103 to rotate about the axis of the hinge portion 112 so that the flip element 103 rests against the keypad 109. This action activates a "hook-switch" which causes the telephone call to be terminated. In the closed position the portable unit is in a standby state ready to receive an incoming call.

Figure 2:
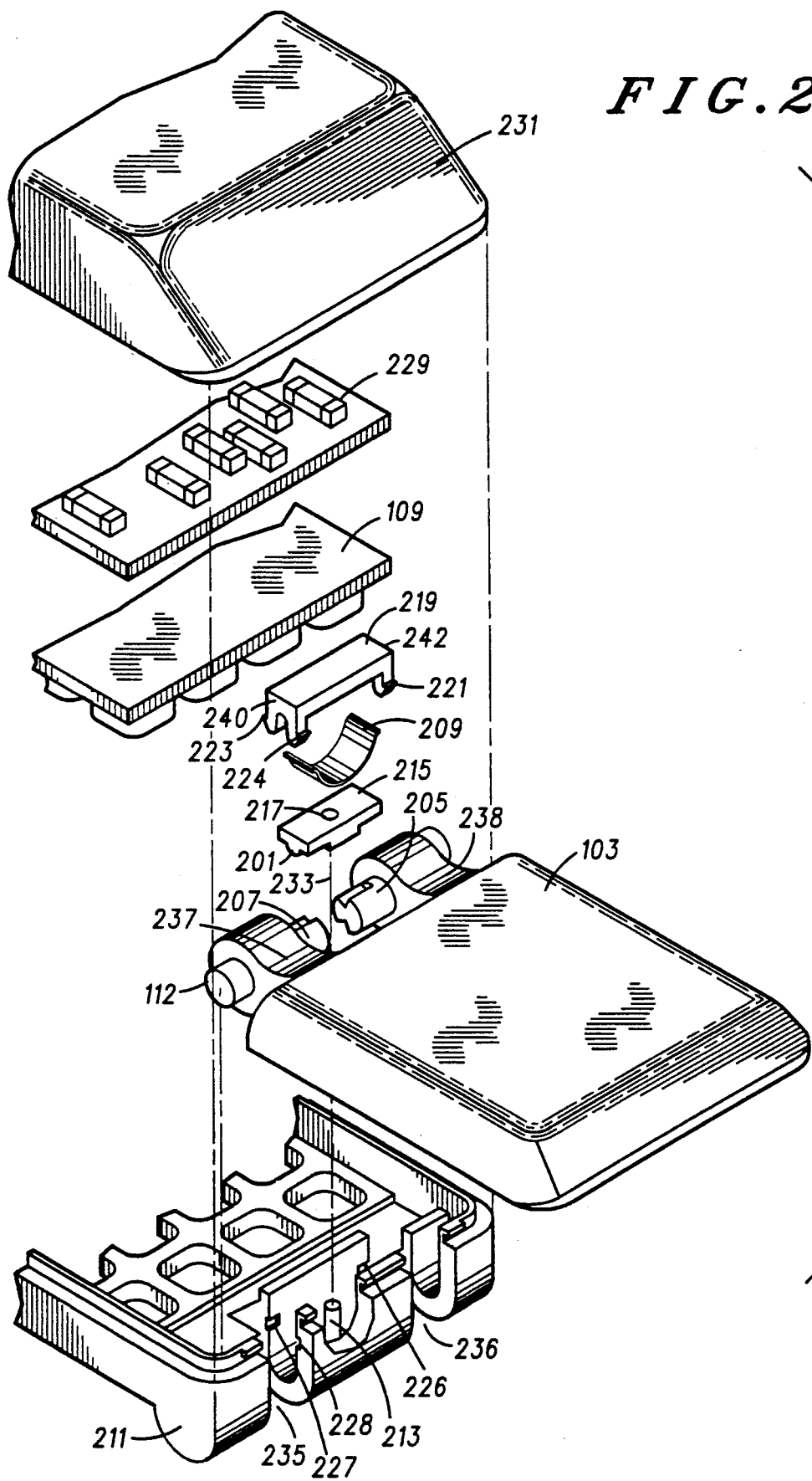
FIG. 2 is an exploded perspective illustration of the cordless radiotelephone unit shown in FIG. 1.

In the preferred embodiment, the flip element 103 is held in the open or closed position by a combination of elements shown in FIG. 2. A detent follower 201 is placed within a hinge cavity 203 and forced against cylindrical hinged shafts 205 and 207 by a resilient medium such as a spring 209. The design of the hinge shafts 205 and 207 allows the flip element 103 to be held against the keypad 109 in the on-hook or closed position and at an obtuse angle (for example, Θ equals 150°) in the off-hook or open position.

A primary advantage of the preferred embodiment of the present invention is that it can be easily assembled along a common axis. The hinge portion 112 of the flip element 103 is placed within the hinge cavity 203 of the front housing 211 of the portable unit 100. Extension bars 237 and 238 connecting the hinge portion 112 to the flip element 103 are positioned within slots 235 and 236, respectively, in the hinge cavity 203 whereby the hinge shafts 205 and 207 are axially located. A cylindrical pin 213 protrudes upward from the bottom of the hinge cavity 203 between hinge shafts 205 and 207. The detent follower 201 is placed on the hinge shafts 205 and 207, having its planar surface 215 facing upward such that the cylindrical pin 213 protrudes partially into an aperture 217 extending through the detent follower 201. The cylindrical pin 213 aligns the detent follower 201 with the hinge shafts 205 and 207. The spring 209 is placed on the planar surface 215 of the detent follower 201. The spring 209 has an upward facing U-shaped bend and is formed from spring steel type 1075. A retainer 219 having three sides is placed over the spring 209 and the detent follower 201 and pressed downward until latching tabs (221, 223 and 224 shown) interlock with the corresponding notches (226, 227 and 228 shown) located in the hinge cavity 203 of the front housing 211. When the retainer 219 is interlocked with the front housing 211 the spring 209 is partially compressed to provide a constant force on the detent follower 201 against the hinge shafts 205 and 207 and to securely locate the retainer 219 within the hinge cavity 203. The two end sides 240 and 242 of the retainer 219 and the hinge cavity 203 position the spring 209 on the detent follower. To complete the assembly of the portable unit 100 the keypad 109 and a printed circuit board 229 are captivated between the front housing 211 and a rear housing 231.

The assembly of the detenting hinge apparatus is performed along the single common axis 233 such that each part is positioned or snapped into place along and from the same direction. Additionally, few parts are used to achieve the detenting hinge apparatus. The retainer 219, the spring 209 and the detent follower 201 are the only discrete parts needed. The hinge shafts 205 and 207 are integrated into the hinge portion 112 of the flip element 103. The notches 225 through 228 are integrated into the hinge cavity 203 of the front housing 211. Thus, the detenting hinge mechanism may be assembled very quickly with little chance for assembly error and/or subsequent failure during use of the assembly.

Furthermore, the detenting hinge apparatus takes up very little space and, additionally, is confined to the hinge cavity 203 of the front housing 211. For example, the assembled distance between the top of the retainer 219 to the bottom curved surface portion of the detent follower 201 pressing against the hinge shafts 205 and 207 is approximately seven millimeters. The width of the retainer 219, the spring 209 and the detent follower 201 assembled within the cavity 203 of the front housing 211 is approximately 5 millimeters.

Figure 3A:
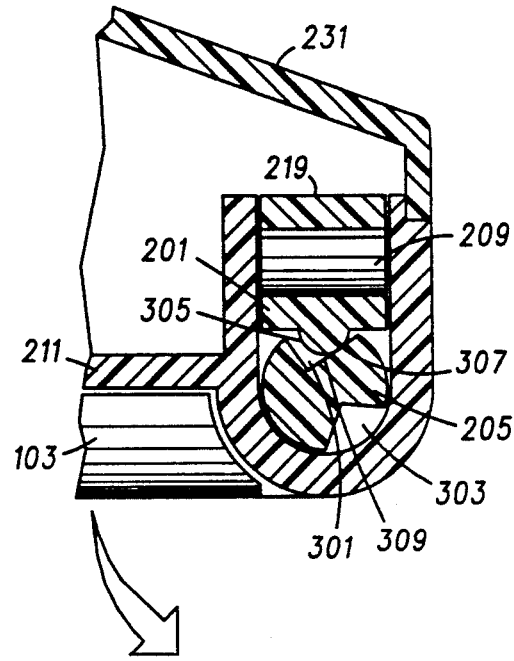
FIG. 3A is a cross sectional illustration of the hinge portion of the radiotelephone unit shown in FIG. 1 with the flip element in its closed position.
Figure 3B:
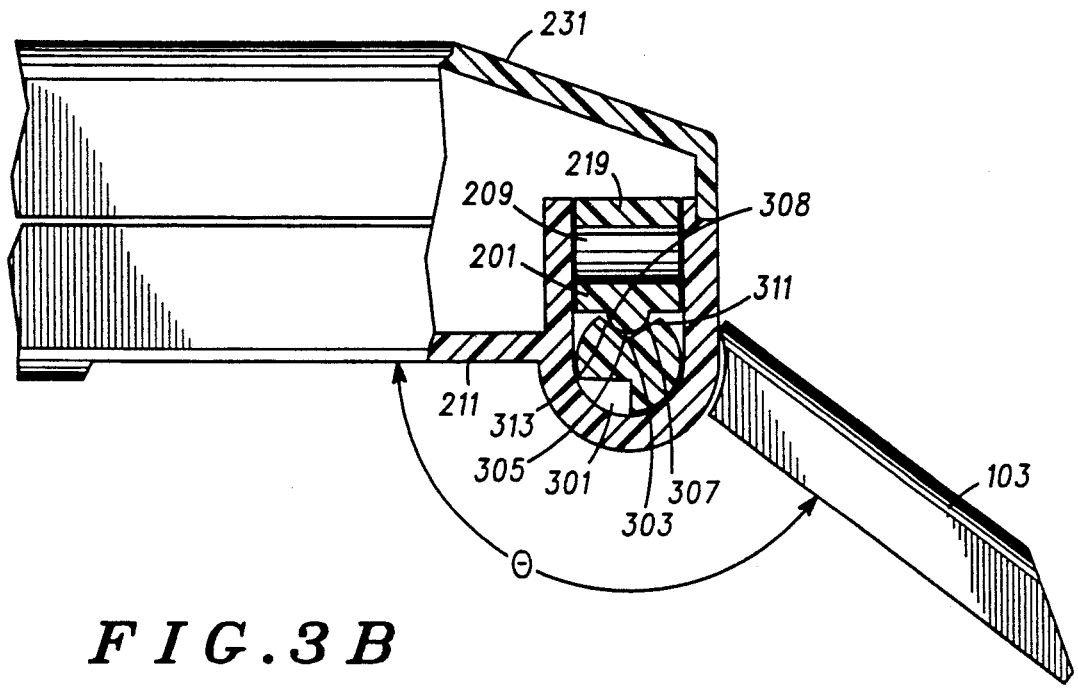
FIG. 3B is a cross sectional illustration of the hinge portion of the radiotelephone unit of FIG. 1 with the flip element in its open position.

A more detailed view of the detenting hinge apparatus is illustrated in FIG. 3A and FIG. 3B. FIG. 3A illustrates the position of recesses 301 and 303 when the flip element 103 is in the closed, on-hook position. FIG. 3B illustrates the position of the recesses 301 and 303 when the flip element is in the open, off-hook position. When opening the flip element 103, the detent follower 201 moves out of recess 301 in the hinge shaft 205 and onto the full diameter surface of the shaft 205. The spring 209, captivated between the retainer 219 and the detent follower 201, constantly forces the detent follower 201 against the hinge shaft 205. As the flip element continues to rotate to the open or off-hook condition, the detent follower cam 201 continues to push against the hinge shaft 205 and then forces itself into the recess 303. The force of the detent follower cam 201 in the recess 303 holds the flip element 103 in the desired position.

Recesses 301 and 303 each have two essentially planar surfaces in which the planes of the surfaces intersect to form an angle. The detent follower 201 has a curved surface 305 engaging the hinge shaft 205. When the flip element is in the closed or on-hook position, a first portion 307 on the curved surface of the detent follower 305 presses against one of the essentially planar surfaces 309 of the recess 301. The pressure of the detent follower 201 against the one surface 309 of recess 301 preloads the flip element 103 against the front housing 211 of the portable unit 100. This novel approach of applying a preloaded force causes the flip element 103 to remain tight against the planar surface of the front housing 211 without using any additional latching mechanisms. When the flip element 103 is in the open or off-hook position, the first portion 307 of the curved surface 305 of the detent follower 201 contacts a first essentially planar surface 311 of recess 303. Likewise, a second portion 308 of the curved surface 305 of the detent follower 201 contacts a second essentially planar surface 313 of recess 303. The curved surface 305 of the detent follower 201 is assured of making contact with the recess 303 at two locations because the curved surface 305 seeks to center itself within the angle formed by the essentially planar surfaces 311 and 313 of the second recess 303. Therefore, the flip element 103 is stabilized in its open, off-hook, position without excessive play.

The design of the hinge shaft 205 allows the flip element 103 to open or close without further user assistance when it is within 45° of either position. It should be noted that recesses 301 and 303 have an edge radius at the corners where the planar surfaces intersect with the full diameter surface which enables the curved surface 305 of the detent follower 201 to smoothly move from one recess 301 to the other recess 303 as the flip element 103 is rotated from its closed to its open position, respectively. The detent follower 201 is formed of a flexible, plastic material such as, for example, "Delrin" (TM), or some other such material having low friction characteristics. The flip element also has the ability to over travel the open position by an amount such as 30°, if forced, and return to the open position automatically when the force is removed. The possibility of breaking or jamming the positioning mechanism is removed by having the entire detenting hinge apparatus contained within the hinge cavity of the front housing.

Figure 4:
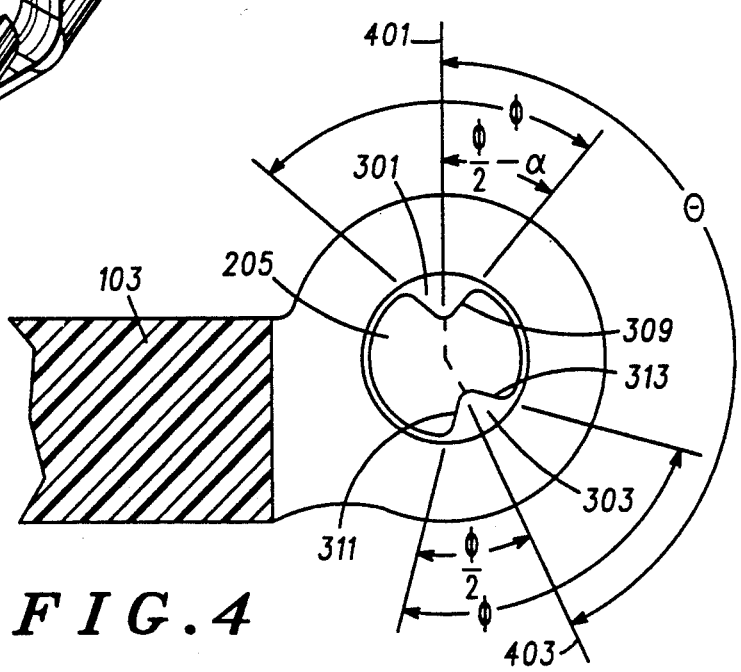
FIG. 4 is an end-view of one of the hinge shafts of the flip element.

FIG. 4 illustrates an end view of the hinge shaft 205 as part of the hinge portion 112 of the flip element 103. Recesses 301 and 303 each have its essentially planar surfaces intersecting at an angle $\Phi$, 90° for example. Alternate embodiments may have recess 301 forming an angle which is different from the angle produced by recess 303. Virtual radial lines 401 and 403 are drawn from the center of the hinge shaft 205 through the vertex of recess 301 and 303, respectively. The virtual line 401 drawn through the vertex of recess 301 splits angle $\Phi$ such that the angle between the first surface 309 of recess 301 and the virtual radial line 401 is somewhat less than half of the full angle $\Phi$ represented by $(\Phi/2)-\alpha$. The offset angle, $(\Phi/2)-\alpha$, (40° in the preferred embodiment where $\alpha=5°$) enables the portion 307 of the curved surface 305 of the detent follower 201 to only engage the recess 301 at one location on the first surface 309 such that the flip element 103 is preloaded against the front housing in its closed position. The virtual radial line 403 bisects angle $\Phi$ in recess 303 which enables the first and second portion 307 and 308 of the symmetrical curve surface 305 of the detent follower 201 to contact the first 311 and second 313 planar surfaces, respectively, to stabilize the flip element in its open position. The angle $\Theta$ between virtual radial line 401 and 403 is predetermined to locate the obtuse angle of the flip element with respect to the front planar surface of the body of the radiotelephone when the flip element 103 is in its open position. In the preferred embodiment angle $\Theta$ equals 150°.

Figure 5:
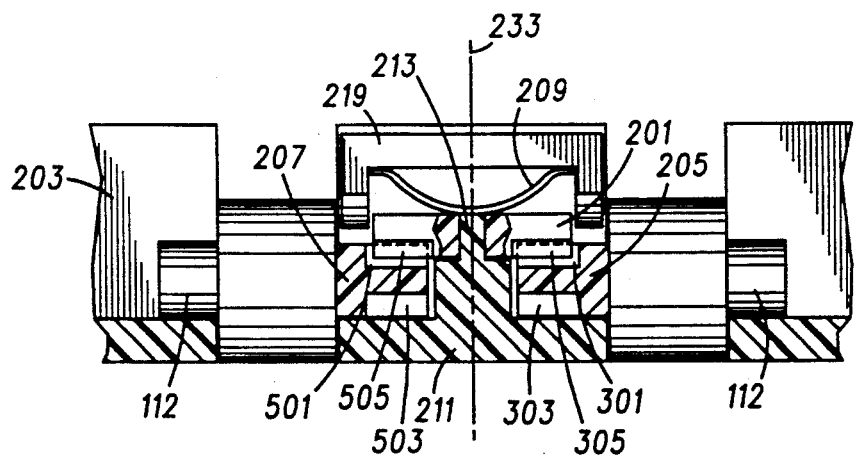
FIG. 5 is a cross sectional view along the rotating axis of the hinge assembly portion of the cordless radiotelephone unit of FIG. 1 with the flip element in its closed position.

A cross sectional view of the hinge portion 112 of the radiotelephone of FIG. 1 is illustrated in FIG. 5. The stack up of the detenting hinge assembly along the common axis 233 is clearly represented. Hinge shafts 205 and 207 of the flip element are positioned within the hinge cavity 203 such that they lie on opposite sides of the pin 213. Hinge shaft 205 has recesses 301 and 303 as described in the end views of the hinge shaft 205 in FIGS. 3A, 3B and 4. Hinge shaft 207 has recesses 501 and 503 located in a corresponding opposite position and having essentially the same shape as recesses 301 and 303, respectively, on hinge shaft 205. The detent follower 201 has the curved surface 305 and a corresponding curved surface 505 having essentially the same shape as curved surface 305 and located opposite the pin 213. The curved surfaces 305 and 505 of the detent follower follow the surface of hinge shafts 205 and 207, respectively, as the flip element is rotated. As the flip element is rotated from its closed to a partially open position, the curved surfaces 305 and 505 slide up one side of the recesses 301 and 501, respectively, onto the full surface diameter of the hinge shafts 205 and 207 respectively, to fully compress the spring 209. As the flip element is fully opened to its desired obtuse angle to the plane of the front housing 211, the curved surfaces 305 and 505 slide down one side of the recesses 303 and 503, respectively, from the full surface diameter of the hinge shafts 205 and 207 respectively, to release the full compression on the spring 209.

The retainer 219 captivates the spring 209 and compresses the spring 209 against the detent follower 201 thereby causing the curved surfaces of the detent follower 305 and 505 to press against the surfaces of the hinge shafts 205 and 207, respectively. Note that when the spring 209 is compressed and the curved surfaces 305 and 505 of the detent follower 201 are within recesses 301 and 501, respectively, the pin 213 only protrudes through a portion of the detent follower 201. Therefore, the detent follower 201 is slideably constrained as the flip element rotates without contacting the spring 209.

Therefore, a detenting hinge apparatus of simple construction as well as of smaller dimensions has been disclosed. Novel elements of the preferred embodiment of the present invention comprise hinge shafts having recesses integral to the hinge portion of the flip element, convenient single common axis assembly of a few simple parts, the detent follower preloading the flip element against the body portion when the flip element is in the closed position and the detent follower stabilizing the flip element in its open position without excessive play.

What is claimed is:

1. A hinge apparatus for a foldable radiotelephone having a body portion and a flip element portion, the hinge apparatus being capable of maintaining the flip portion in at least a first position of rotation relative to the body portion, the hinge apparatus comprising:

a first essentially cylindrical hinge shaft, integrally formed with the flip element portion and at least partially disposed within the body portion, rotatably coupling the flip element portion to the body portion;

a first recess disposed in a surface of the first cylindrical hinge shaft; and a follower, disposed within the body portion, contacting the first recess when the flip element portion is rotated to the first position to thereby maintain the flip element portion in the first position.

2. A hinge apparatus in accordance with claim 1 wherein the hinge apparatus is capable of maintaining the flip element in a second position of rotation relative to the body portion, the hinge apparatus further comprising:
 a second recess disposed in the wall of the first cylindrical hinge shaft, the follower contacting the second recess when the flip element portion is rotated to the second position to thereby maintain the flip element portion in the second position.

3. A hinge apparatus for a foldable radiotelephone having a body portion and a flip element portion, the hinge apparatus being capable of maintaining the flip portion in at least two positions of rotation relative to the body portion, a first position being parallel to a front surface plane of the body portion and a second position being at an obtuse angle to the front surface plane of the body portion, the hinge apparatus comprising:
 first and second essentially cylindrical hinge shafts, integrally formed with the flip element portion and at least partially disposed within the body portion, rotatably coupling the flip element portion to the body portion about a longitudinal axis common to the first and second cylindrical hinge shafts;
 first and second recesses disposed in each surface of the first and second cylindrical hinge shafts; and
 a follower, disposed within the body portion, contacting the first recess in each surface of the first and second cylindrical hinge shafts when the flip element is in the first position to thereby maintain the flip element in the first position and contacting the second recess in each surface of the first and second cylindrical hinge shafts, respectively, when the flip element is in the second position to thereby maintain the flip element in the second position.

4. A hinge apparatus in accordance with claim 3 further comprising:
 means for urging the flip element portion against the body portion when the flip element is in the first position.

5. A hinge apparatus in accordance with claim 3 further comprising:
 means for slidably constraining the follower to linear movement essentially perpendicular to the longitudinal axis.

6. A hinge apparatus in accordance with claim 3 further comprising:
 means for urging the follower against the surface of the first and second cylindrical hinge shafts.

7. A hinge apparatus for a foldable radiotelephone having a body portion and a flip element portion, the hinge apparatus being capable of maintaining the flip element portion in at least a first position of rotation relative to the body portion, the hinge apparatus comprising:
 a first essentially cylindrical hinge shaft, integrally formed with the flip element portion and at least partially disposed within the body portion, rotatably coupling the flip element portion to the body portion about a longitudinal axis of the cylindrical hinge shaft;
 a follower disposed within the body portion;
 means for slidably constraining the follower to linear movement essentially perpendicular to the longitudinal axis;
 at least a first positioning surface on the first cylindrical hinge shaft adapted for cooperative engagement with a first portion of the follower; and
 means for urging the first portion of the follower against the first cylindrical hinge shaft permitting the first portion of the follower to cooperatively engage the first positioning surface when the flip element is rotated to the first position to thereby maintain the flip element portion in the first position.

8. The hinge apparatus in accordance with claim 7 further comprising:
 a second essentially cylindrical hinge shaft, integrally formed with the flip element portion, longitudinally disposed along the longitudinal axis and at least partially within the body portion, rotatably coupling the flip element portion to the body portion about the longitudinal axis; and
 a first positioning surface on the second cylindrical hinge shaft adapted for cooperative engagement with a second portion of the follower, the second portion of the follower cooperatively engaging the first positioning surface of the second cylindrical hinge shaft, responsive to the means for urging, when the flip element portion is rotated to the first position to thereby maintain the flip element portion in the first position.

9. The hinge apparatus in accordance with claim 7 wherein the hinge apparatus is capable of maintaining the flip element portion in a second position of rotation relative to the body portion, the hinge apparatus further comprising:
 a second positioning surface on the first cylindrical hinge shaft adapted for cooperative engagement with the first portion of the follower, the first portion of the follower cooperatively engaging the second positioning surface of the first cylindrical hinge shaft, responsive to the means for urging, when the flip element portion is rotated to the second position to thereby maintain the flip element portion in the second position.

10. The hinge apparatus in accordance with claim 7 wherein the means for slidably constraining further comprises:
 an essentially cylindrical pin integrally formed with the body portion and disposed essentially perpendicular to the longitudinal axis, the follower having a hole disposed therein, the cylindrical pin having a diameter slightly smaller than the hole and at least partially disposed therein whereby the follower is slidably constrained to linear movement essentially perpendicular to the longitudinal axis.

11. The hinge apparatus in accordance with claim 7 wherein the means for urging further comprises:
 a resilient medium disposed essentially opposite the follower; and
 means for compressing the resilient medium against the follower to urge the first portion of the follower against the first cylindrical hinge shaft.

12. The hinge apparatus in accordance with claim 7 further comprising:
 the follower, the means for slidably constraining and the means for urging disposed along a common axis of assembly within the body portion essentially perpendicular to the longitudinal axis.

13. A foldable radiotelephone comprising:
 a first housing portion;
 a second housing portion;
 an essentially cylindrical hinge shaft, integrally formed with the second housing portion and at least partially disposed within the first housing portion, rotatably coupling the second housing portion to the first housing portion about a longitudinal axis of the cylindrical hinge shaft;

a follower disposed within the first housing portion;

means for slidably constraining the follower to linear movement essentially perpendicular to the longitudinal axis;

at least a first positioning surface on the cylindrical hinge shaft adapted for cooperative engagement with the follower; and means for urging the follower against the cylindrical hinge shaft permitting the follower to cooperatively engage the first positioning surface when the second housing portion is rotated to the first position to thereby maintain the second housing portion in a position of rotation relative to the first housing portion.

14. A hinge apparatus for a foldable radiotelephone having a body portion and a flip element portion, the hinge apparatus being capable of maintaining the flip element portion in a position of rotation relative to the body portion, the hinge apparatus comprising:

an essentially cylindrical hinge shaft, integrally formed with the flip element portion and at least partially disposed within the body portion, rotatably coupling the flip element portion to the body portion about a longitudinal axis of the cylindrical hinge shaft;

a follower disposed within the body portion;

a positioning surface on the first cylindrical hinge shaft adapted for cooperative engagement with a portion of the follower; and means for urging the portion of the follower against the first cylindrical hinge shaft permitting the portion of the follower to cooperatively engage the positioning surface when the flip element portion is rotated to the first position to thereby maintain the flip element portion in the first position; and the follower and the means for urging disposed along a common axis of assembly within the body portion essentially perpendicular to the longitudinal axis.

* * * * *